(12) United States Patent
Sawaguchi

(10) Patent No.: US 8,717,906 B2
(45) Date of Patent: May 6, 2014

(54) NETWORK RELAY DEVICE, NETWORK, AND NETWORK MAINTENANCE AND OPERATION METHOD

(75) Inventor: Chikara Sawaguchi, Tsukuba (JP)

(73) Assignee: Hitachi Metals, Ltd., Tokyo (JP)

( * ) Notice: Subject to any disclaimer, the term of this patent is extended or adjusted under 35 U.S.C. 154(b) by 389 days.

(21) Appl. No.: 12/659,068

(22) Filed: Feb. 24, 2010

(65) Prior Publication Data

US 2010/0278048 A1 Nov. 4, 2010

(30) Foreign Application Priority Data

May 1, 2009 (JP) ................................ 2009-112067

(51) Int. Cl.
*H04J 1/16* (2006.01)

(52) U.S. Cl.
USPC .......... 370/241.1; 379/242; 379/249; 709/223

(58) Field of Classification Search
USPC ........... 370/242, 248, 249, 250, 401; 709/223
See application file for complete search history.

(56) References Cited

U.S. PATENT DOCUMENTS

| | | | |
|---|---|---|---|
| 2005/0169270 A1 | 8/2005 | Mutou et al. | |
| 2006/0285501 A1* | 12/2006 | Damm | 370/252 |
| 2008/0172497 A1* | 7/2008 | Mohan et al. | 709/249 |
| 2009/0141703 A1* | 6/2009 | Ghodrat et al. | 370/352 |
| 2009/0225660 A1* | 9/2009 | Sakurai | 370/241.1 |
| 2010/0220739 A1 | 9/2010 | Ishiguro | |
| 2010/0226376 A1* | 9/2010 | Mohan et al. | 370/395.53 |
| 2011/0216772 A1* | 9/2011 | Mohan et al. | 370/392 |
| 2011/0292836 A1* | 12/2011 | Bragg et al. | 370/255 |

FOREIGN PATENT DOCUMENTS

| | | |
|---|---|---|
| JP | 2008-167331 | 7/2008 |
| WO | WO 2004/084506 A1 | 9/2004 |
| WO | WO 2009/051179 A1 | 4/2009 |

OTHER PUBLICATIONS

Kunio Hato, Masahiro Suzuki, Muneyoshi Maruyoshi, "Summary of IEEE802.1ah provider backbone bridge", NTT Technology journal 2006.4, No. 4, vol. 18, pp. 12-16, Apr. 1, 2006, Telecommunications Association (Previously Submitted).
Japanese Office Action dated Jan. 29, 2013 with English translation thereof.
Japanese Office Action dated Oct. 30, 2012 with English translation thereof.
Kunio Hato, Masahiro Suzuki, Muneyoshi Maruyoshi, "Summary of IEEE802.1ah provider backbone bridge", NTT Technology journal 2006.4, No. 4, vol. 18, pp. 12-16, Apr. 1, 2006, Telecomunication Association, with partial English translation thereof.

* cited by examiner

*Primary Examiner* — Awet Haile
(74) *Attorney, Agent, or Firm* — McGinn IP Law Group, PLLC

(57) ABSTRACT

A network relay device constituting a network includes a frame determination unit for referencing a protocol identifier contained in a frame from an external network relay device constituting another standard network different from the network, to determine whether or not the frame contains a confirmation frame for network operation, administration or maintenance, and a processing unit for performing operation, administration, or maintenance on the frame, when the frame determination unit determines that the frame is the confirmation frame.

3 Claims, 10 Drawing Sheets

FIG.2

| DA MAC ADDRESS(6B) | SA MAC ADDRESS(6B) | VLAN TAG (4B) | Ether Type (2B) | MD Level + version (1B) | OP code (1B) | Flags (1B) | TLV offset (1B) | TLV | END TLV (1B) | FCS (4B) |

FIG.3

| DA MAC ADDRESS(6B) | SA MAC ADDRESS(6B) | VLAN TAG (4B) | Ether Type (2B) | Data | FCS (4B) |

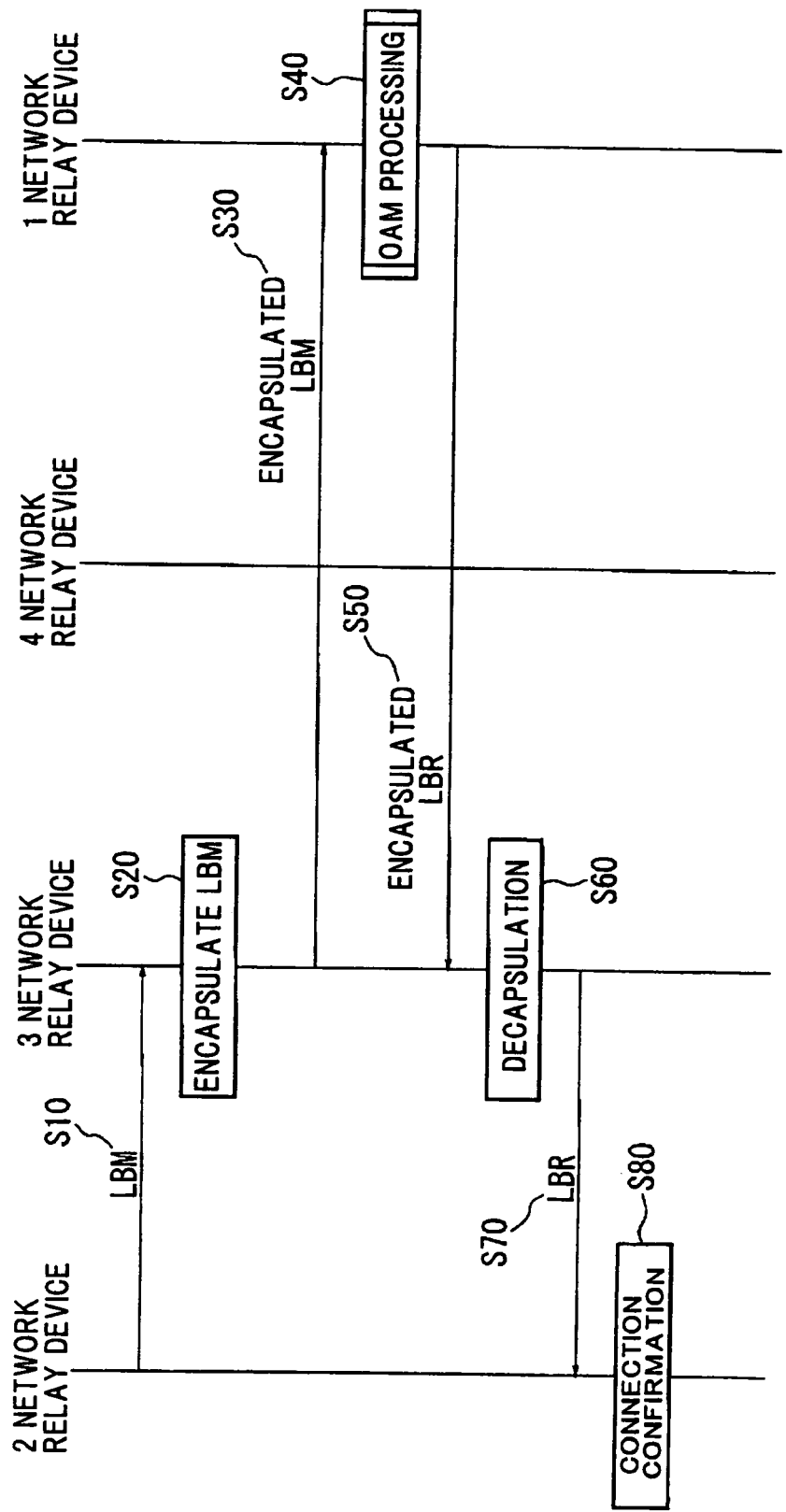

NETWORK RELAY DEVICE, NETWORK, AND NETWORK MAINTENANCE AND OPERATION METHOD

The present application is based on Japanese patent application No. 2009-112067 filed on May 1, 2009, the entire contents of which are incorporated herein by reference.

BACKGROUND OF THE INVENTION

1. Field of the Invention

The present invention relates to a network relay device, a network, and a network maintenance and operation method. In particular, it relates to a network relay device, a network, and a network maintenance and operation method using Ethernet OAM.

2. Description of the Related Art

Ethernet developed as a local area network (LAN) technology is also used for broadband networks. In broadband networks, despite requiring the security of communications, there have been prepared few functions for network maintenance and operation for conventional Ethernet. Accordingly, an Ethernet operation, administration and maintenance (OAM) function has been specified in ITU-T Y.1731 and IEEE802.1ag.

Also, a technology is standardized in IEEE 802.1ah that uses an encapsulation method called MAC-in-MAC as a high reliability method for Ethernet to provide a large scale network. IEEE 802.1ah provider backbone bridging (PBB) networks are host backbone networks for tying IEEE 802.1ad provider bridging (PB) networks. The PBB networks are suitable for use in large scale networks, compared to the PB networks.

Conventionally, a maintenance domain level administration method is known that is for operation, maintenance and administration of a network by transmitting/receiving Ethernet OAM frames inclusive of maintenance domain levels between two communication devices through the network. This maintenance domain level administration method includes the steps of transmitting an Ethernet OAM frame to be transmitted from a first to a second communication device through the network, with an outer OAM header added thereto; causing the communication devices connected to the network to perform operation, maintenance and administration based on maintenance domain levels included in the outer OAM header; and causing the second communication device to eliminate the outer OAM header from the OAM frame received from the first communication device and transmit the OAM frame.

With the above construction, this maintenance domain level administration method allows operation, maintenance and administration with numerous maintenance domains within a network using Ethernet OAM frames.

Refer to JP-A-2008-167331, for example.

In the maintenance domain level administration method disclosed by JP-A-2008-167331, when transmitting/receiving Ethernet OAM frames between mutually different standard networks, however, the specified network relay device connected to the network relays or discards an OAM frame transmitted from a network relay device connected to a different standard network without being able to determine it as an OAM frame. Proper network maintenance and operation is therefore impossible.

SUMMARY OF THE INVENTION

Accordingly, it is an object of the present invention to provide a network relay device, a network, and a network maintenance and operation method, capable of proper network maintenance and operation even when transmitting/receiving OAM frames between mutually different standard networks.

(1) According to one embodiment of the invention, a network relay device constituting a network comprises:

a frame determination unit for referencing a protocol identifier contained in a frame from an external network relay device constituting another standard network different from the network, to determine whether or not the frame contains a confirmation frame for network operation, administration or maintenance; and a processing unit for performing operation, administration, or maintenance on the frame, when the frame determination unit determines that the frame is the confirmation frame.

In the above embodiment (1), the following modifications and changes can be made.

(i) The network comprises a network in accordance with IEEE802.1ah standard, the other network comprises a network in accordance with IEEE802.1ad standard, the protocol identifier comprises an Ether type, the confirmation frame comprises an Ethernet OAM frame, the frame determination unit references the Ether type, to determine whether or not the frame contains the Ethernet OAM frame, and whether or not the frame is addressed to that network relay device, and the processing unit performs the operation, administration, or maintenance on the frame, based on an Ethernet OAM function, when the frame determination unit determines that the frame is the Ethernet OAM frame, and is addressed to that network relay device.

(ii) The network relay device further comprises a transmit/receive unit including a port for receiving the frame from the external network relay device, wherein the processing unit returns the processed frame from the port having received the frame from the external network relay device.

(2) According to another embodiment of the invention, a network comprises:

a first network relay device constituting a first network;

a second network relay device constituting a second standard network different from the first network; and a third network relay device provided at the boundary between the first and the second network, wherein the first network relay device transmits a confirmation frame for network operation, administration or maintenance, to the second network relay device, the third network relay device encapsulates the confirmation frame to create an encapsulated confirmation frame, and then relay the encapsulated confirmation frame to the second network, and the second network relay device comprises a transmit/receive unit for receiving the encapsulated confirmation frame, a frame determination unit for referencing a protocol identifier of the encapsulated confirmation frame received in the transmit/receive unit, to determine whether or not the encapsulated confirmation frame contains the confirmation frame, a processing unit for performing operation, administration, or maintenance on the encapsulated confirmation frame, to convert into a return encapsulated response frame when the frame determination unit determines that the encapsulated confirmation frame is the confirmation frame, and a forwarding unit for forwarding the encapsulated response frame to the first network relay device.

In the above embodiment (2), the following modifications and changes can be made.

(iii) The first network comprises a network in accordance with IEEE802.1ad standard, the second network comprises a network in accordance with IEEE802.1ah standard, the protocol identifier comprises an Ether type, the confirmation frame comprises an Ethernet OAM frame, the frame determination unit references the Ether type of the encapsulated confirmation frame, to determine whether or not the encapsulated confirmation frame contains the Ethernet OAM frame, and whether or not the encapsulated confirmation frame is addressed to the second network relay device, and the processing unit performs the operation, administration, or maintenance on the encapsulated confirmation frame, based on an Ethernet OAM function, when the frame determination unit determines that the encapsulated confirmation frame is the encapsulated Ethernet OAM frame, and is addressed to the second network relay device.

(3) According to another embodiment of the invention, a network maintenance and operation method comprising a first network relay device constituting a first network, a second network relay device constituting a second standard network different from the first network, and a third network relay device provided at the boundary between the first and the second network, comprises:

transmitting from the first network relay device a confirmation frame for network operation, administration or maintenance, to the second network relay device;

encapsulating the confirmation frame at the third network relay device to create an encapsulated confirmation frame, and then relay the encapsulated confirmation frame to the second network;

receiving the encapsulated confirmation frame in the second network relay device;

at the second network relay device, referencing a protocol identifier of the received encapsulated confirmation frame, to determine whether or not the encapsulated confirmation frame contains the confirmation frame;

at the second network relay device, performing operation, administration, or maintenance on the encapsulated confirmation frame, to convert into a return encapsulated response frame when it is determined that the encapsulated confirmation frame is the confirmation frame; and at the second network relay device, forwarding the encapsulated response frame to the first network relay device.

In the above embodiment (3), the following modifications and changes can be made.

(iv) The first network comprises a network in accordance with IEEE802.1ad standard, the second network comprises a network in accordance with IEEE802.1ah standard, the protocol identifier comprises an Ether type, the confirmation frame comprises an Ethernet OAM frame, the determining step includes referencing the Ether type of the encapsulated confirmation frame, to determine whether or not the encapsulated confirmation frame contains the Ethernet OAM frame, and whether or not the encapsulated confirmation frame is addressed to the second network relay device, and the converting step includes performing the operation, administration, or maintenance on the encapsulated confirmation frame, based on an Ethernet OAM function, when it is determined that the encapsulated confirmation frame is the encapsulated Ethernet OAM frame, and is addressed to the second network relay device.

POINTS OF THE INVENTION

According to one embodiment of the invention, a network relay device can, even when receiving an encapsulated frame, determine whether or not the encapsulated frame contains an Ethernet OAM frame in reference to a protocol identifier (e.g., Ether Type) in the encapsulated frame, and when it contains an Ethernet OAM frame, the network relay device allows the Ethernet OAM to function. This allows the network relay device to be applied to the Ethernet OAM, for example, when a network includes an IEEE802.1ad network and an IEEE802.1ah network connected with each other, and even when the Ethernet OAM frame is encapsulated in network paths. That is, the network relay device can be applied to the Ethernet OAM, even when the Ethernet OAM frame is encapsulated in network paths, such as when the initiating MEP is placed in the IEEE802.1ad network and the terminating MEP is placed in the IEEE802.1ah network. Accordingly, the network relay device in this embodiment allows the network relay device arranged in the IEEE802.1ah network to be maintained and operated from a network relay device arranged in the IEEE802.1ad network, using the Ethernet OAM.

BRIEF DESCRIPTION OF THE DRAWINGS

The preferred embodiments according to the invention will be explained below referring to the drawings, wherein:

FIG. 2 is a diagram showing an Ethernet OAM frame format;

FIG. 3 is a diagram showing an IEEE802.1ad frame format;

FIG. 8A is a diagram showing flows of a network maintenance and operation method in this embodiment;

DETAILED DESCRIPTION OF THE PREFERRED EMBODIMENTS

Network Relay Device 1 Construction

Figure 1:
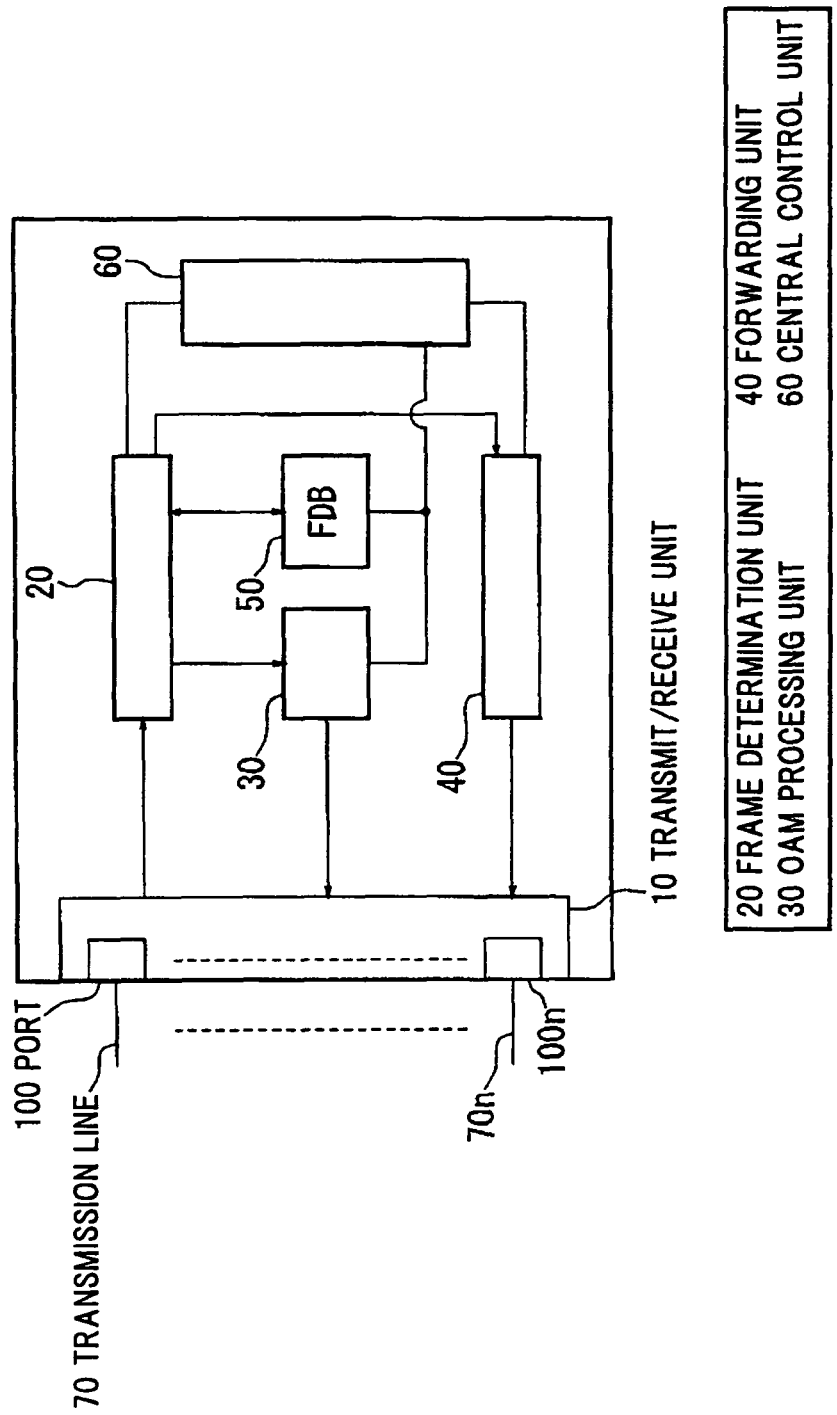
FIG. 1 is a block diagram showing a function and construction of a network relay device in an embodiment according to the invention.

FIG. 1 is a block diagram showing a function and construction of a network relay device in an embodiment according to the invention.

A network relay device 1 in this embodiment includes: a transmit/receive unit 10 for transmitting/receiving information such as a frame; a frame determination unit 20 for referencing the information received in the transmit/receive unit 10 and determining whether or not specified information is contained in that information and addressed to that network relay device 1; an OAM processing unit 30 for performing specified processing on that information based on the determined result of the frame determination unit 20; a forwarding unit 40 for forwarding that information to another network relay device; an FDB (forwarding database) 50 for storing a port having received that information (i.e. receiving port) and a source address; and a central control unit 60 for controlling the operation of the frame determination unit 20, etc.

The network relay device 1 in this embodiment is, for example, a network relay device which constitutes an IEEE802.1ah network. The network relay device 1 (e.g. a switching hub) is maintained and operated using an Ethernet OAM frame as a confirmation frame for network operation, administration or maintenance, from an external network relay device which constitutes another IEEE802.1ad standard network different from that IEEE802.1ah network.

Frame Data Formats

First, described is information to be managed in this embodiment.

Figure 4:
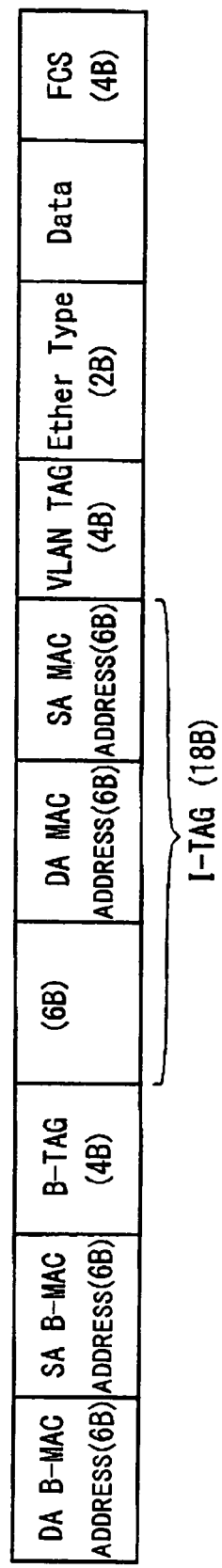
FIG. 4 is a diagram showing an IEEE802.1ah frame format.

FIG. 2 shows an Ethernet OAM frame format. FIG. 3 shows an IEEE802.1ad frame format. FIG. 4 shows an IEEE802.1ah frame format.

Referring to FIG. 2, the Ethernet OAM frame includes each field of a destination address (DA) MAC address (DA MAC address), a source address (SA) MAC address (SA MAC address), a VLAN tag (VLAN TAG), an Ether type (Ether Type) for storing an identifier indicative of Ethernet OAM, a maintenance domain (MD) level version (MD Level+version), an operation code (OP code), flags (Flags), a type/length/value offset (TLV offset), a TLV, an end TLV (END TLV), and a flame check sequence (FCS).

Referring to FIG. 3, the IEEE802.1ad frame format includes each field of a destination address (DA) MAC address (DA MAC address), a source address (SA) MAC address (SA MAC address), a VLAN tag (VLAN TAG), an Ether type (Ether Type), data (Data), and a flame check sequence (FCS).

Also, referring to FIG. 4, the IEEE802.1ah frame format includes the IEEE802.1ad frame format plus each field of a destination address B-MAC address (DA B-MAC address), a source address B-MAC address (SA B-MAC address), a B-tag (B-TAG), and an I-tag (I-TAG: a field with a 6B extension tag added to the DA MAC address and the SA MAC address). Also, only the I-TAG may, without including the B-TAG be included in the frame format.

Below is described a construction of the network relay device 1 in this embodiment, referring to FIG. 1.

Transmit/Receive Unit 10

The transmit/receive unit 10 has a port 100 to be connected with a transmission line 70, which is a cable for Ethernet. The transmit/receive unit 10 is provided with a plurality of ports, which are respectively connected with transmission lines. Specifically, ports 100n are connected with transmission lines 70n, respectively, where n is positive integers. The transmit/receive unit 10 provides an information frame received in the port 100 to the frame determination unit 20. That frame is that transmitted from the external network relay device.

Also, the transmit/receive unit 10 transmits a frame provided from the later described OAM processing unit 30 to a specified port, from that specified port to a specified external network relay device. Further, the transmit/receive unit 10 transmits a frame provided from the later described forwarding unit 40 to a specified port, from that specified port to a specified external network relay device.

FDB 50

The FDB 50 stores a port identifier for identifying a port having received a frame, and a source address (e.g. an MAC address) of that frame. The FDB 50 may store a VLAN_ID, along with the port identifier and the MAC address.

Frame Determination Unit 20

The frame determination unit 20 references the contents of the frame received from the transmit/receive unit 10 from the beginning. The frame determination unit 20 then references an Ether type that is a protocol identifier contained in the frame from the external network relay device constituting another standard network different from the network connected directly with the network relay device 1 with the frame determination unit 20, and it determines whether or not that frame contains an Ethernet OAM frame as a confirmation frame for network operation, administration or maintenance. Further, the frame determination unit 20 determines whether or not that frame is addressed to the network relay device 1 with the frame determination unit 20. Specifically, the frame determination unit 20 is operated, based on its referenced contents, as follows.

First, the frame determination unit 20 checks the presence of an I-TAG field of the frame, to determine whether or not that frame is an IEEE802.1ah format frame. When determining that that frame is an IEEE802.1ah format frame, the frame determination unit 20 references the Ether type that is a protocol identifier contained in the frame. Next, when an identification value indicative of being Ethernet OAM is contained in the Ether type, the frame determination unit 20 references a destination address MAC address (DA MAC address). When that destination address MAC address is the same as the MAC address of the network relay device 1 with the frame determination unit 20, the frame determination unit 20 provides that frame to the OAM processing unit 30.

On the other hand, when that destination address MAC address is different from the MAC address of the network relay device 1 with the frame determination unit 20, the frame determination unit 20 implements the normal frame determination and provides that frame to the forwarding unit 40.

Also, when the frame determination unit 20 checks the presence of the Ether type field, and determines that that frame is an IEEE802.1ah format frame, it implements the normal frame determination and provides that frame to the forwarding unit 40.

Here is explained "the normal frame determination" implemented by the frame determination unit 20 in this embodiment. The normal frame determination implemented by the frame determination unit 20 involves source information learning and destination retrieval.

Source Information Learning

The frame determination unit 20 associates frame source information (e.g. an SA MAC address for an IEEE802.1ad format frame, an SA B-MAC address for an IEEE802.1ah format frame) and a VLAN_ID, with the port having received that frame, and registers them into the FDB 50.

Destination Retrieval

The frame determination unit 20 retrieves from the FDB 50 frame destination information (e.g. a DA MAC address for an IEEE802.1ad format frame, a DA B-MAC address for an IEEE802.1ah format frame) and the VLAN_ID, to retrieve the port associated with that destination information and VLAN_ID. The frame determination unit 20 then determines that the port detected is a forwarding destination port, and provides the frame addressed to that forwarding destination port, to the forwarding unit 40. When the port identifier is not being stored in the FDB 50, the frame determination unit 20 provides that frame to the forwarding unit 40 as a flooding.

OAM Processing Unit 30

The OAM processing unit 30 references the contents of the OP code and other data fields of the frame received from the frame determination unit 20, to perform processing on the frame, based on a function, which is specified in the referenced contents, such as operation, administration, or maintenance based on an Ethernet OAM function. For example, when the function specified in the referenced contents is a Loop Back Message (LBM), a Link Trace Message (LTM), a Loss Measurement Message (LMM), or the like, the OAM processing unit 30 converts the LBM into a Loop Back Reply (LBR), the LTM into a Link Trace Reply (LTR), or the LMM into a Loss Measurement Reply (LMR).

The OAM processing unit 30 then provides the LBR, the LTR or the LMR to the port of the transmit/receive unit 10 having received the frame. In this case, the OAM processing unit 30 performs the conversion to replace the destination address B-MAC address and the source address B-MAC address of the IEEE802.1ah format frame, and to replace the destination address MAC address and the source address MAC address. Further, the OAM processing unit 30 also converts the OP code. In addition, when the function specified in the referenced contents is a continuity check message (CCM), the OAM processing unit 30 provides the frame to the central control unit 60, which is controlled by software.

Also, the OAM processing unit 30 references the contents of the OP code and other data fields of the frame received from the frame determination unit 20, and when the function specified in the referenced contents is the LBM, LTM, or LMM, the OAM processing unit 30 may, instead of converting the LBM, LTM, or LMM into the LBR, LTR, or LMR, create a new LBR, LTR, or LMR. Further, the OAM processing unit 30 may have both the function of converting the LBM, LTM, or LMM into the LBR, LTR, or LMR, and the function of creating a new LBR, LTR, or LMR.

The frame determination unit 20 and the OAM processing unit 30 are constructed by use of an integrated circuit (i.e. hardware), such as an application specific integrated circuit (ASIC), a field programmable gate array (FPGA), or the like. Also, the frame determination unit 20 and the OAM processing unit 30 are equipped with software.

Forwarding Unit 40

When information with a specified forwarding destination port (i.e. a forwarding destination port identifier and a frame) is provided from the frame determination unit 20 to the forwarding unit 40, the forwarding unit 40 forwards the frame to the port identified by that port identifier. Also, when information is provided from the frame determination unit 20 to the forwarding unit 40 as a flooding, the forwarding unit 40 forwards that information to all ports but a port having received that information.

Central Control Unit 60

The central control unit 60 is equipped with software, which controls the operation of each unit included in the network relay device 1, such as the frame determination unit 20, the OAM processing unit 30, the forwarding unit 40, and the FDB 50.

Ethernet OAM Function

Figure 5:
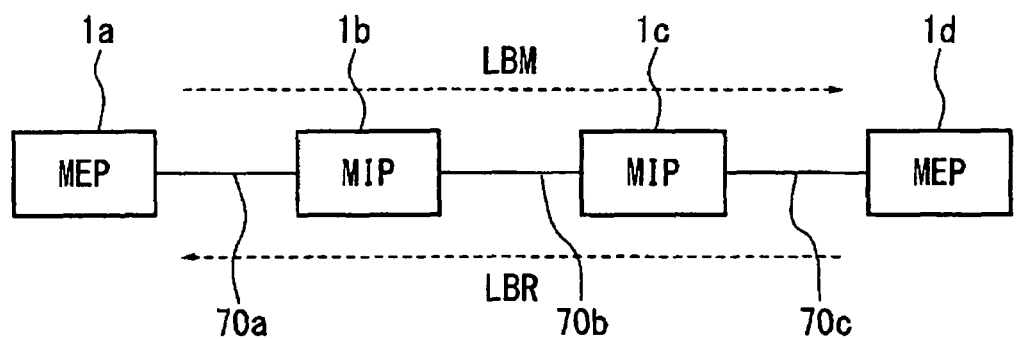
FIG. 5 is a schematic diagram showing a network for explaining an Ethernet OAM function in the embodiment according to the invention.

FIG. 5 schematically shows a network for explaining an Ethernet OAM function in the embodiment according to the invention.

In FIG. 5 is described Loop Back (LB) operation as one example. Network relay devices 1a to 1d each are equipped with an Ethernet OAM function. The network relay devices 1a to 1d are, for example, layer-2 switching hubs, and each serve to relay IEEE802.1ad format frames. In FIG. 5, the network relay device 1a is configured as an initiating maintenance end point (herein, also referred to as "MEP"); and the network relay device 1d is configured as a terminating MEP, while the network relay devices 1b and 1c are configured as maintenance intermediate points (herein, also referred to as "MIPs").

First, an LBM frame is transmitted from the network relay device 1a to 1d. For example, the network relay device 1a transmits the LBM frame through a transmission line 70a. The LBM frame has the frame format described in FIG. 2, and contains a MAC address of the network relay device 1d as a DA, a MAC address of the network relay device 1a itself as an SA, an Ethernet OAM identification value as an Ether Type, and the value "03" indicative of the LBM as an OP code.

Next, the network relay device 1b having received the LBM frame, and the network relay device 1c relay the LBM frame to the network relay device 1d through a transmission line 70b and a transmission line 70c, respectively.

The frame determination unit 20 of the network relay device 1d having received the LBM frame determines whether or not that LBM frame is addressed to the network relay device 1d itself. When the frame determination unit 20 determines that that LBM frame is addressed to the network relay device 1d, the OAM processing unit 30 converts the LBM frame into an LBR frame addressed to the network relay device 1a. The OAM processing unit 30 then transmits the LBR frame from the transmit/receive unit 10 to the network relay device 1a. The LBR frame is a frame into which the contents of the LBM frame are converted by rewriting its DA as a MAC address of the network relay device 1a, its SA as a MAC address of the network relay device 1d itself, and its OP code as the value "02" indicative of the LBR.

The network relay device 1b and the network relay device 1c relay the LBR frame to the network relay device 1a. The frame determination unit 20 of the network relay device 1a having received the LBR frame determines that this LBR frame has been returned from the network relay device 1d. This confirms the path connection between the network relay devices 1a and 1d.

IEEE802.1ah Network Construction

Figure 6:
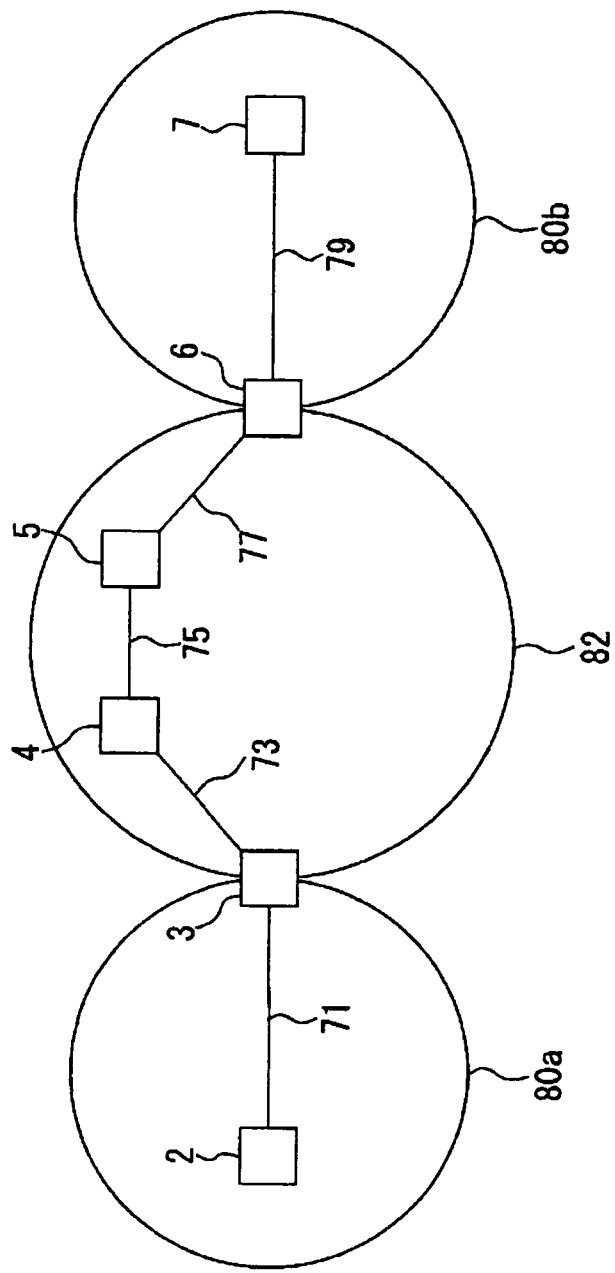
FIG. 6 is a schematic diagram showing a construction of an IEEE802.1ah network.

FIG. 6 schematically shows a construction of an IEEE802.1ah network.

Herein, a network in accordance with IEEE802.1ah is referred to as an "IEEE802.1ah network," and a network in accordance with IEEE802.1ad is referred to as an "IEEE802.1ad network."

Network relay devices 2 and 7 relay an IEEE802.1ad format frame. Also, network relay devices 3 and 6 are, for example, PBB edge switches, and encapsulate an IEEE802.1ad format frame to generate an IEEE802.1ah format frame to relay to an IEEE802.1ah network, or decapsulate an IEEE802.1ah format frame to generate an IEEE802.1ad format frame to relay to an IEEE802.1ad network. Network relay devices 4 and 5 are, for example, PBB core switches, and relay an IEEE802.1ah format frame.

When information is transmitted from the network relay device 2 to 7, the IEEE802.1ad format frame, whose destination address MAC address is set as a MAC address of the network relay device 7, is transmitted from the network relay device 2 to 7. In an IEEE802.1ad network 80a, the IEEE802.1ad format frame is relayed to the network relay device 3, based on its destination address MAC address. In FIG. 6, as one example, the IEEE802.1ad format frame is relayed to the network relay device 3 through a transmission line 71.

The network relay device 3 receives the IEEE802.1ad format frame from the network relay device 2, and encapsulates that IEEE802.1ad format frame, thereby generating an IEEE802.1ah format frame. The network relay device 3 then relays that IEEE802.1ah format frame to an IEEE802.1ad network 82. The network relay devices 4 and 5 relay this IEEE802.1ah format frame. In FIG. 6, the IEEE802.1ah format frame is relayed from the network relay device 3 to 4 through a transmission line 73, from the network relay device 4 to 5 through a transmission line 75, and from the network relay device 5 to 6 through a transmission line 77.

In the IEEE802.1ah network 82, the IEEE802.1ah format frame is relayed based on its destination address B-MAC address added in the network relay device 3, that serves as the PBB edge switch. The network relay device 6 receives the IEEE802.1ah format frame, and decapsulates the received IEEE802.1ah format frame, thereby generating an IEEE802.1ad format frame. The network relay device 6 then relays that IEEE802.1ad format frame to an IEEE802.1ad network 80b. This IEEE802.1ad format frame is relayed to the network relay device 7, based on its destination address MAC address. In FIG. 6, the IEEE802.1ad format frame is relayed from the network relay device 6 to 7 through a transmission line 79.

Figure 7:
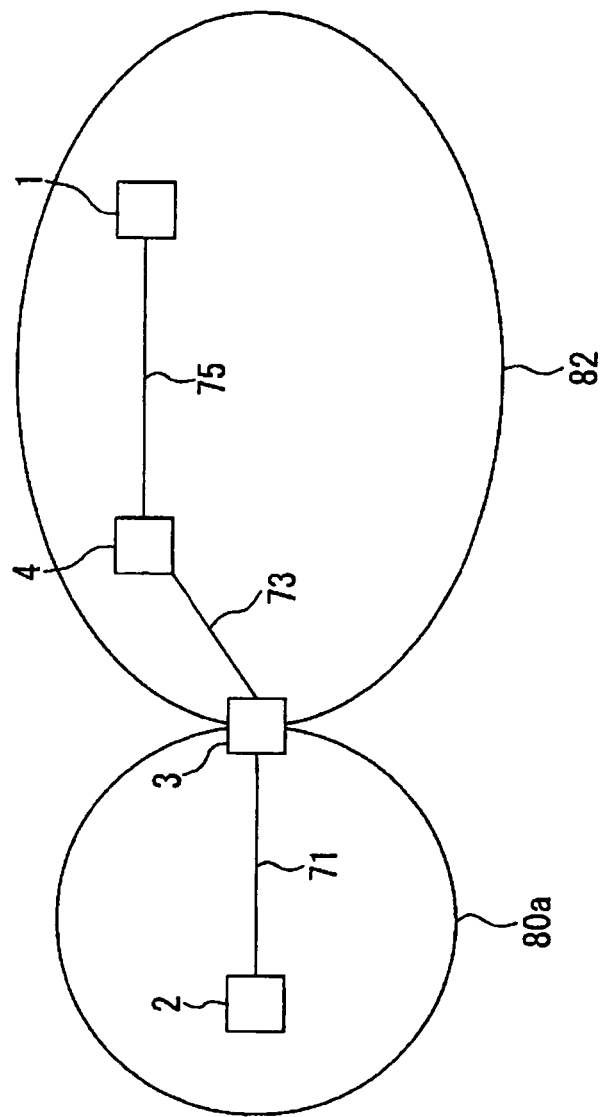
FIG. 7 is a schematic diagram showing a network in the embodiment according to the invention.

FIG. 7 schematically shows a network in the embodiment according to the invention.

A first network relay device 2 is arranged in a first IEEE802.1ad network 80a, and relays an IEEE802.1ad format frame. Also, a third network relay device 3 is arranged at the boundary between the IEEE802.1ad network 80a and an IEEE802.1ah network 82. The network relay device 3 is a PBB edge switch, which encapsulates an IEEE802.1ad format frame to generate an IEEE802.1ah format frame to relay to the IEEE802.1ah network 82, or which decapsulates an IEEE802.1ah format frame to generate an IEEE802.1ad format frame to relay to the IEEE802.1ad network 80a.

A network relay device 4 and a second network relay device 1 are arranged in the second IEEE802.1ah network 82, and serves as PBB core switches, which relay an IEEE802.1ah format frame. In the network thus configured, the network relay device 2 arranged in the IEEE802.1ad network 80a is configured as an initiating MEP, and the network relay device 1 arranged in the IEEE802.1ah network 82 is configured as a terminating MEP, while the paths between the network relay devices 2 and 1 are maintained and operated with Ethernet OAM.

The network relay device 2 is equipped with an Ethernet OAM function, and at least includes an Ethernet OAM frame generation unit for generating an Ethernet OAM frame as a confirmation frame for network operation, administration or maintenance, a frame determination unit for determining whether or not a received frame is an Ethernet OAM frame, and a processing unit for relaying the frame, or converting the contents of the frame and returning it, based on the contents of the Ethernet OAM frame. When the network relay device 3 receives an Ethernet OAM frame from the network relay device 2, the network relay device 3 encapsulates that Ethernet OAM frame and relays the encapsulated Ethernet OAM frame to the IEEE802.1ah network 82 as an encapsulated confirmation frame.

Network Maintenance and Operation Method

Figure 8B:
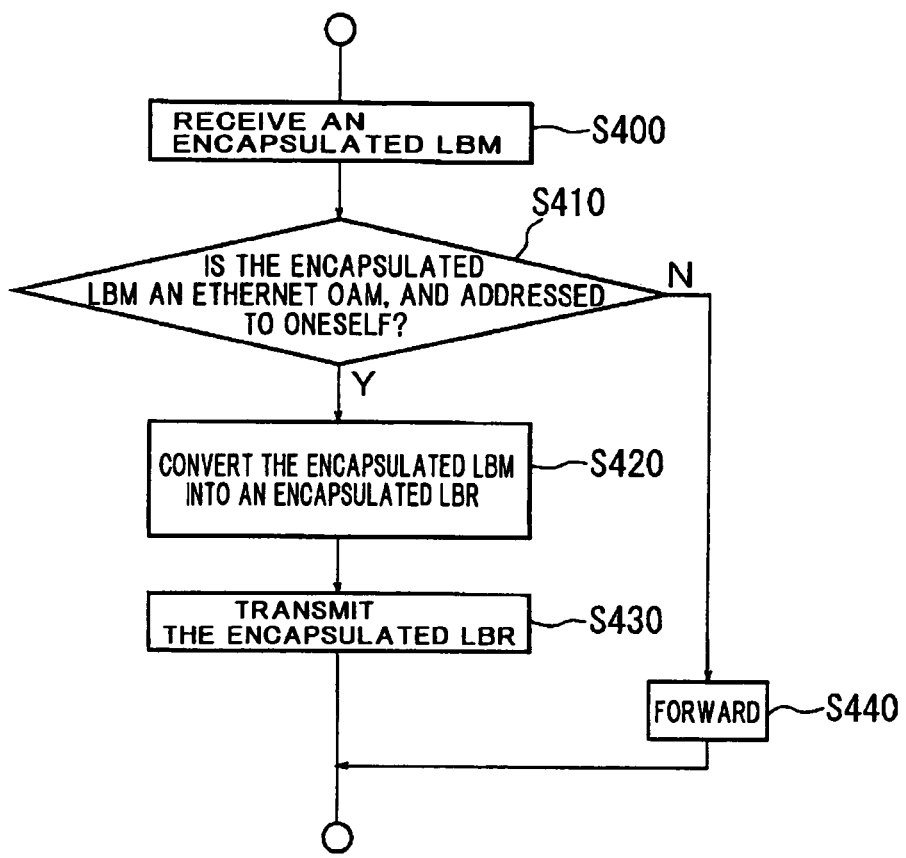
FIG. 8B is a diagram showing flows of a network maintenance and operation method in this embodiment.

FIG. 8A and FIG. 8B show one example of flows of a network maintenance and operation method in this embodiment.

In this embodiment, one example of the network maintenance and operation method is described with reference to the network shown in FIG. 7, and by way of an example of Loop Back (LB) operation of Ethernet OAM functions. As the Ethernet OAM frame serving as a confirmation frame, there are an LB frame (i.e. LBM), a CC frame (i.e. CCM), an LT frame (i.e. LTM), etc.

First, the network relay device 2 arranged in the IEEE802.1ad network 80a produces an LBM addressed to the network relay device 1 arranged in the IEEE802.1ah network 82 and transmits the LBM to the network relay device 1 (Transmitting step: S10). The LBM contains both a MAC address of the network relay device 1 as its destination address MAC address, and a MAC address of the network relay device 2 as its source address MAC address.

The LBM is relayed in the IEEE802.1ad network 80a, based on its destination address MAC address, to arrive at the network relay device 3, that serves as the PBB edge switch. The network relay device 3 encapsulates the received LBM (Encapsulating step: S20). The network relay device 3 then relays the encapsulated LBM to the IEEE802.1ah network 82 (Relaying step: S30). The encapsulated LBM contains the MAC address of the network relay device 1 as its destination address B-MAC address, and a MAC address of the network relay device 3 as its source address B-MAC address. When the MAC address of the network relay device 1 is not being registered in the FDB of the network relay device 3, a flooding value is stored at the destination address B-MAC address. The encapsulated LBM is relayed in the IEEE802.1ah network 82, based on its destination address B-MAC address, to arrive at the network relay device 1.

The network relay device 1 receives the encapsulated LBM, and performs OAM processing (S40). Specifically, the transmit/receive unit 10 of the network relay device 1 first receives the encapsulated LBM (Receiving step: S400). The transmit/receive unit 10 provides the received encapsulated LBM to the frame determination unit 20. The frame determination unit 20 references the contents of the received encapsulated LBM, and determines, from its Ether type, whether or not that encapsulated LBM is an Ethernet OAM, and from its destination address MAC address, whether or not it is addressed to oneself (Determining step: S410).

When the frame determination unit 20 determines that that encapsulated LBM is an Ethernet OAM, and from its destination address MAC address, that it is addressed to oneself (S410: Y), the frame determination unit 20 provides that encapsulated LBM to the OAM processing unit 30. In the IEEE802.1ah standard, the core switch (i.e. the network relay device 1 in this embodiment) serves to discard a frame whose B-MAC address is addressed to oneself. Even when the B-MAC address of the Ethernet OAM frame is addressed to oneself, when determining that the Ethernet OAM frame is addressed to oneself, however, the network relay device 1 in this embodiment continues processing without discarding that Ethernet OAM frame. When the frame determination unit 20 determines that that encapsulated LBM is not an Ethernet OAM, or, from its destination address MAC address, that it is not addressed to oneself (S410: N), the frame determination unit 20 forwards that encapsulated LBM (Forwarding step: S440).

The OAM processing unit 30 determines, from its OP code, whether or not the received frame is an encapsulated LBM. When determining that that frame is an encapsulated LBM, the OAM processing unit 30 converts the encapsulated LBM into an encapsulated LBR for encapsulated response frame returning, based on the Ethernet OAM function (Converting step: S420). The encapsulated LBR is generated by replacing the destination address B-MAC address and the source address B-MAC address of the encapsulated LBM, to store the MAC address of the network relay device 3 at the destination address B-MAC address and the MAC address of the network relay device 1 itself at the source address B-MAC address. Also, concurrently, the OAM processing unit 30 replaces the destination address MAC address and the source address MAC address, to store the MAC address of the network relay device 2 serving as the IEEE802.1ad switch at the destination address MAC address and the MAC address of the network relay device 1 itself at the source address MAC address. The OAM processing unit 30 then provides the encapsulated LBR to the transmit/receive unit 10.

The transmit/receive unit 10 forwards the encapsulated LBR, based on the destination address B-MAC address of the encapsulated LBR (Forwarding step: S430). The encapsulated LBR is relayed in the IEEE802.1ah network 82, based on its destination address B-MAC address (S50), to arrive at the network relay device 3. The network relay device 3 decapsulates the received encapsulated LBR (S60), and relays the decapsulated LBR to the IEEE802.1ad network 80a (S70). The LBR is relayed in the IEEE802.1ad network 80a, based on its destination address MAC address, to arrive at the network relay device 1. This allows the confirmation of the path connection between the network relay device 2 arranged in the IEEE802.1ad network 80a and the network relay device 1 arranged in the IEEE802.1ah network 82 (S80).

Comparative Example

Figure 9:
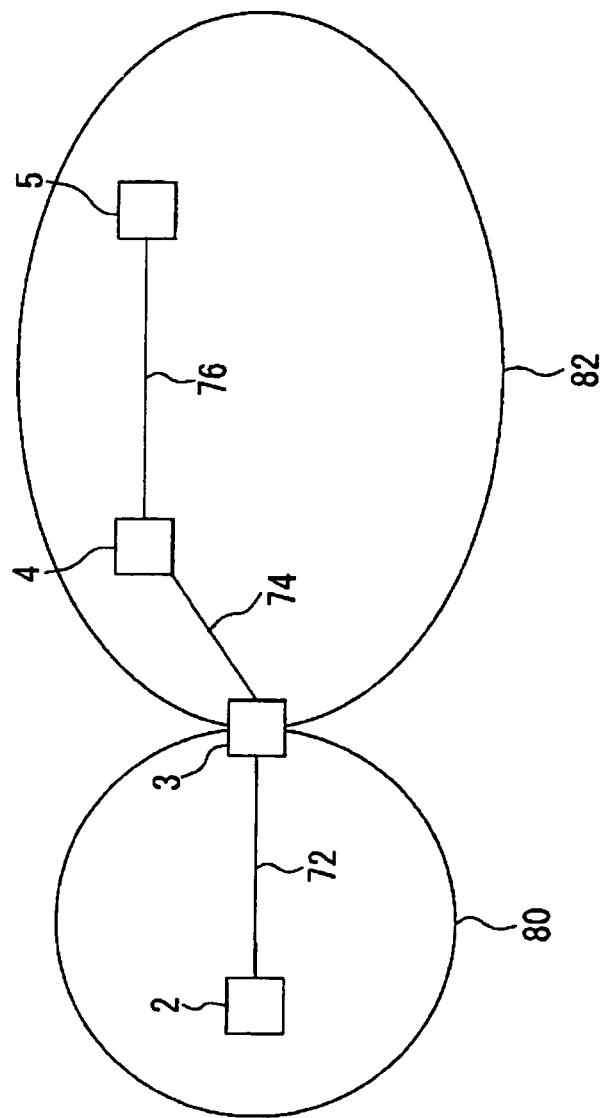
FIG. 9 is a schematic diagram showing a network in a comparative example.

FIG. 9 schematically shows a network in a comparative example.

The network in the comparative example uses, in the IEEE802.1ah network 82, a network relay device 5 with no function of the network relay device 1 in this embodiment, in place of the network relay device 1 in this embodiment.

First, the network relay device 2 transmits an LBM whose destination address MAC address is specified as a MAC address of the network relay device 5, and whose source address MAC address is specified as a MAC address of the network relay device 2. The network relay device 3 encapsulates the received LBM to generate an encapsulated LBM. The network relay device 3 then relays the encapsulated LBM to the IEEE802.1ah network 82.

In this case, when the MAC address of the network relay device 5 is not being registered in the FDB of the network relay device 3, the network relay device 3 stores a broadcast value at the destination address B-MAC address of the encapsulated LBM. On the other hand, when the MAC address of the network relay device 5 is being registered in that FDB, the network relay device 3 stores the MAC address of the network relay device 5 at the destination address B-MAC address of the encapsulated LBM.

Following this, the network relay device 5 having received the encapsulated LBM references the destination address B-MAC address of the encapsulated LBM, and when determining that the broadcast value is being stored, relays or discards the encapsulated LBM. On the other hand, the network relay device 5 references the destination address B-MAC address, and when determining that the MAC address of the network relay device 5 is being stored, the network relay device 3 discards the encapsulated LBM as the IEEE802.1ah standard specifies that the core switch discards frames whose B-MAC address is addressed to oneself. Thus, the network relay device 5 fails to determine that the encapsulated LBM is addressed to oneself, and the Ethernet OAM therefore does not function in the comparative example.

That is, in the comparative example, in the network including the IEEE802.1ad network 80 and the IEEE802.1ah network 82, when the initiating MEP (i.e. the network relay device 2) is placed in the IEEE802.1ad network 80 and the terminating MEP (i.e. the network relay device 5) is placed in the IEEE802.1ah network 82, the Ethernet OAM frame addressed from the network relay device 2 to 5 is encapsulated, and the Ethernet OAM therefore cannot be applied to the network relay device 5.

Advantages of the Embodiment

The network relay device 1 in this embodiment can, even when receiving an encapsulated frame, determine whether or not the encapsulated frame contains an Ethernet OAM frame, and when it contains an Ethernet OAM frame, the network relay device 1 allows the Ethernet OAM to function. This allows the network relay device 1 to be applied to the Ethernet OAM, for example, when a network includes an IEEE802.1ad network and an IEEE802.1ah network connected with each other, and even when the Ethernet OAM frame is encapsulated in network paths.

That is, the network relay device 1 in this embodiment can be applied to the Ethernet OAM, even when the Ethernet OAM frame is encapsulated in network paths, such as when the initiating MEP is placed in the IEEE802.1ad network and the terminating MEP is placed in the IEEE802.1ah network. Accordingly, the network relay device 1 in this embodiment allows the network relay device 1 arranged in the IEEE802.1ah network to be maintained and operated from a network relay device arranged in the IEEE802.1ad network, using the Ethernet OAM.

Although the invention has been described with respect to the above embodiments, the above embodiments are not intended to limit the appended claims. Also, it should be noted that not all the combinations of the features described in the above embodiments are essential to the means for solving the problems of the invention.

What is claimed is:

1. A network relay device constituting a first network said network relay device comprising:
    a receiving unit for receiving a frame transmitted from an external network relay device constituting a second network different from the first network,
    wherein the frame is encapsulated on the way by another relay device at a boundary between the first network and the second network, and relayed as an encapsulated frame to the network relay device, which when the frame comprises a confirmation frame for a network operation, an administration, or a maintenance, includes in a protocol identifier an identifier indicative of the confirmation frame for the network operation, the administration, or the maintenance,
    a frame determination unit for receiving the encapsulated frame and referencing the protocol identifier included in the encapsulated frame to determine whether the encapsulated frame includes the confirmation frame for the network operation, the administration, or the maintenance; and
    a processing unit for performing any of the network operation, the administration, or the maintenance on the encapsulated frame, when the frame determination unit determines that the encapsulated frame includes the confirmation frame,
    wherein, before an encapsulation of the encapsulated frame, the frame includes each field of a destination address (DA) MAC address, a source address (SA) MAC address, and an Ether type,
    wherein, after the encapsulation, the encapsulated frame includes a DA B-MAC address and an SA MAC address, the DA MAC address, the SA MAC address, and the Ether type contained in an original frame, and
    wherein the first network comprises a network in accordance with IEEE802.1ah standard,
    wherein the second network comprises a network in accordance with IEEE802.1ad standard,
    wherein the protocol identifier comprises the Ether type,
    wherein the confirmation frame comprises an Ethernet OAM (operation, administration, and maintenance) frame, wherein the frame determination unit references the Ether type, to determine whether the frame includes the Ethernet OAM frame, and determines whether the frame is addressed to the network relay device.

2. A network, comprising:
a first network relay device constituting a first network;
a second network relay device constituting a second standard network different from the first network; and
a third network relay device provided at a boundary between the first and the second network,
wherein the first network relay device transmits a confirmation frame for a network operation, an administration, or a maintenance, which includes in a protocol identifier an identifier indicative of the confirmation frame for the network operation, the administration, or the maintenance, to the second network relay device,
wherein the third network relay device encapsulates the confirmation frame to create an encapsulated confirmation frame, and then relays the encapsulated confirmation frame to the second network, wherein the second network relay device comprises:
a transmit/receive unit for receiving the encapsulated confirmation frame;
a frame determination unit for referencing the protocol identifier included in the encapsulated confirmation frame received in the transmit/receive unit, to determine whether the encapsulated confirmation frame includes the confirmation frame;
a processing unit for performing any of the network operation, the administration, or the maintenance on the encapsulated confirmation frame, to convert into a return encapsulated response frame when the frame determination unit determines that the encapsulated confirmation frame includes the confirmation frame; and
a forwarding unit for forwarding the encapsulated response frame to the first network relay device;
wherein, before an encapsulation of the encapsulated frame, a frame includes each field of a destination address (DA) MAC address, a source address (SA) MAC address, and an Ether type,
wherein, after the encapsulation, the encapsulated frame includes a DA B-MAC address and an SA MAC address, the DA MAC address, the SA MAC address, and the Ether type contained in an original frame, and
wherein the first network comprises a network in accordance with IEEE802.1ad standard, wherein the second network comprises a network in accordance with IEEE802.1ah standard,
wherein the protocol identifier comprises the Ether type, wherein the confirmation frame comprises an Ethernet OAM (operation, administration, and maintenance) frame,
wherein the frame determination unit references the Ether type of the encapsulated confirmation frame, and determines whether the encapsulated confirmation frame includes the Ethernet OAM frame, and whether the encapsulated confirmation frame is addressed to the second network relay device.

3. A network maintenance and operation method for a network comprising a first network relay device constituting a first network, a second network relay device constituting a second standard network different from the first network, and a third network relay device provided at a boundary between the first and the second network, said network maintenance and operation method comprising:
transmitting from the first network relay device a confirmation frame for a network operation, an administration, or a maintenance, which includes in a protocol identifier an identifier indicative of the confirmation frame for the network operation, the administration, or the maintenance, to the second network relay device;
encapsulating the confirmation frame at the third network relay device to create an encapsulated confirmation frame, and then relay the encapsulated confirmation frame to the second network;
receiving the encapsulated confirmation frame in the second network relay device;
at the second network relay device, referencing the protocol identifier included in the received encapsulated confirmation frame, to determine whether the encapsulated confirmation frame includes the confirmation frame;
at the second network relay device, performing any of the network operation, the administration, or the maintenance on the encapsulated confirmation frame, to convert into a return encapsulated response frame when it is determined that the encapsulated confirmation frame includes the confirmation frame; and at the second network relay device, forwarding the encapsulated response frame to the first network relay device,
wherein, before an encapsulation of the encapsulated frame, a frame includes each field of a destination address (DA) MAC address, a source address (SA) MAC address, and an Ether type,
wherein, after the encapsulation, the encapsulated frame includes a DA B-MAC address and an SA MAC address, the DA MAC address, the SA MAC address, and the Ether type contained in an original frame, and
wherein the first network comprises a network in accordance with IEEE802.1ad standard,
wherein the second network comprises a network in accordance with IEEE802.1ah standard,
wherein the protocol identifier comprises the Ether type,
wherein the confirmation frame comprises an Ethernet OAM (operation, administration, and maintenance) frame,
wherein the determining includes referencing an Ether type of the encapsulated confirmation frame, and determining whether the encapsulated confirmation frame includes the Ethernet OAM frame, and whether the encapsulated confirmation frame is addressed to the second network relay device.

* * * * *